(12) United States Patent
Fiebiger et al.

(10) Patent No.: US 7,828,204 B2
(45) Date of Patent: Nov. 9, 2010

(54) TECHNIQUES FOR AUTHORIZATION OF USAGE OF A PAYMENT DEVICE

(75) Inventors: Sara Fiebiger, Ellisville, MO (US); Adam Gluck, Ardsley, NY (US); Dennis J Hill, St Paul, MO (US); Carole Kelly-Frank, Wildwood, MO (US); Arthur D Kranzley, Pound Ridge, NY (US); Robert D Reany, Wildwood, MO (US)

(73) Assignee: MasterCard International Incorporated, Purchase, NY (US)

( * ) Notice: Subject to any disclaimer, the term of this patent is extended or adjusted under 35 U.S.C. 154(b) by 862 days.

(21) Appl. No.: 11/626,408

(22) Filed: Jan. 24, 2007

(65) Prior Publication Data
US 2007/0262139 A1 Nov. 15, 2007

Related U.S. Application Data

(60) Provisional application No. 60/764,106, filed on Feb. 1, 2006.

(51) Int. Cl.
*G06K 5/00* (2006.01)
(52) U.S. Cl. ..................................................... 235/380
(58) Field of Classification Search .................. 235/379, 235/380
See application file for complete search history.

(56) References Cited

U.S. PATENT DOCUMENTS

| 3,438,489 | A | 4/1969 | Cambornac et al. |
|---|---|---|---|
| 4,654,658 | A | 3/1987 | Walton |
| 4,849,613 | A | 7/1989 | Eisele |
| 4,891,503 | A | 1/1990 | Jewell et al. |
| 4,899,036 | A | 2/1990 | McCrindle et al. |
| 5,053,774 | A | 10/1991 | Schuermann et al. |
| 5,103,079 | A | 4/1992 | Barakai et al. |
| 5,191,193 | A | 3/1993 | Le Roux |
| 5,285,382 | A | 2/1994 | Muehleberger et al. |
| 5,286,955 | A | 2/1994 | Klosa |

(Continued)

FOREIGN PATENT DOCUMENTS

EP 0 254 595 A2 1/1988

(Continued)

OTHER PUBLICATIONS

"Hashing Credit Card Numbers" by Integrigy, Feb. 27, 2007 (16 pages).

(Continued)

*Primary Examiner*—Seung H Lee
*Assistant Examiner*—Christopher Stanford
(74) *Attorney, Agent, or Firm*—Otterstedt, Ellenbogen & Kammer, LLP; Leonardo Renna; Paul J. Otterstedt (57) ABSTRACT

Techniques for authorization of usage of a payment device include facilitating an issuer of the device obtaining an authorization message for an account number associated with the device, based on desired spending limit parameters established by a merchant and/or an issuer of the device; facilitating obtaining an issuer authorization decision; and responsive to the issuer authorization decision, facilitating setting a spending limit for the account number based on at least an appropriate one of the parameters.

31 Claims, 4 Drawing Sheets

U.S. PATENT DOCUMENTS

| | | | |
|---|---|---|---|
| 5,337,063 | A | 8/1994 | Takahira |
| 5,384,449 | A | 1/1995 | Pierce |
| 5,396,558 | A | 3/1995 | Ishiguro et al. |
| 5,449,894 | A | 9/1995 | Bruhnke et al. |
| 5,479,172 | A | 12/1995 | Smith et al. |
| 5,485,510 | A | 1/1996 | Colbert |
| 5,504,321 | A | 4/1996 | Sheldon |
| 5,679,938 | A | 10/1997 | Templeton et al. |
| 5,819,234 | A | 10/1998 | Slavin et al. |
| 5,828,044 | A | 10/1998 | Jun et al. |
| 5,917,913 | A | 6/1999 | Wang |
| 6,018,717 | A | 1/2000 | Lee et al. |
| 6,023,682 | A | 2/2000 | Checchio |
| 6,038,552 | A | 3/2000 | Fleischl et al. |
| 6,064,988 | A | 5/2000 | Thomas |
| 6,078,888 | A | 6/2000 | Johnson, Jr. |
| 6,154,778 | A | 11/2000 | Koistinen et al. |
| 6,182,894 | B1 | 2/2001 | Hackett et al. |
| 6,394,341 | B1 | 5/2002 | Makipaa et al. |
| 6,422,460 | B1 | 7/2002 | Boesch |
| 6,480,101 | B1 | 11/2002 | Kelly et al. |
| 6,554,183 | B1 | 4/2003 | Sticha et al. |
| 6,651,885 | B1 | 11/2003 | Arias |
| 6,655,587 | B2 | 12/2003 | Andrews et al. |
| 6,675,153 | B1 | 1/2004 | Cook et al. |
| 6,732,922 | B2 | 5/2004 | Lindgren et al. |
| 6,749,114 | B2 | 6/2004 | Madani |
| 6,848,613 | B2 | 2/2005 | Nielsen et al. |
| 6,850,916 | B1 | 2/2005 | Wang |
| 6,853,987 | B1 | 2/2005 | Cook |
| 6,923,371 | B2 | 8/2005 | Goodfellow |
| 6,931,382 | B2 | 8/2005 | Laage et al. |
| 6,934,849 | B2 | 8/2005 | Kramer et al. |
| 6,999,944 | B1 | 2/2006 | Cook |
| 7,003,495 | B1 | 2/2006 | Burger et al. |
| 7,021,532 | B2 | 4/2006 | Robinson et al. |
| 7,039,611 | B2 | 5/2006 | Devine |
| 7,566,003 | B2 | 7/2009 | Silbernagl et al. |
| 7,568,617 | B2 | 8/2009 | Silbernagl et al. |
| 2001/0029494 | A1 | 10/2001 | Tomita |
| 2002/0032661 | A1 | 3/2002 | Schuba et al. |
| 2002/0124184 | A1 | 9/2002 | Fichadia et al. |
| 2002/0138445 | A1 | 9/2002 | Laage et al. |
| 2002/0156745 | A1 | 10/2002 | Tallent et al. |
| 2002/0161729 | A1 | 10/2002 | Andrews |
| 2002/0170959 | A1 | 11/2002 | Madani |
| 2002/0174013 | A1 | 11/2002 | Freeman et al. |
| 2003/0055786 | A1 | 3/2003 | Smith et al. |
| 2003/0061163 | A1 | 3/2003 | Durfield |
| 2003/0074317 | A1 | 4/2003 | Hofi |
| 2003/0088777 | A1 | 5/2003 | Bae et al. |
| 2003/0101137 | A1 | 5/2003 | Wronski |
| 2004/0039694 | A1 | 2/2004 | Dunn et al. |
| 2004/0128258 | A1 | 7/2004 | Su |
| 2004/0243510 | A1 | 12/2004 | Hinderer et al. |
| 2005/0044039 | A1 | 2/2005 | Greer |
| 2005/0131826 | A1 | 6/2005 | Cook |
| 2005/0149455 | A1 | 7/2005 | Bruesewitz et al. |
| 2005/0184145 | A1 | 8/2005 | Simon et al. |
| 2005/0216405 | A1 | 9/2005 | So |
| 2005/0262026 | A1 | 11/2005 | Watkins |
| 2005/0269398 | A1 | 12/2005 | Robinson et al. |
| 2006/0031161 | A1 | 2/2006 | D'Agostino |
| 2006/0278704 | A1 | 12/2006 | Saunders et al. |
| 2008/0033880 | A1 | 2/2008 | Fiebiger et al. |
| 2008/0156873 | A1 | 7/2008 | Wilhelm et al. |

FOREIGN PATENT DOCUMENTS

| | | |
|---|---|---|
| GB | 2 267 626 A | 8/1993 |
| WO | WO 94/22115 | 9/1994 |
| WO | WO 97/00501 | 1/1997 |
| WO | WO 2006/124808 A2 | 11/2006 |
| WO | WO 2006/124808 A3 | 11/2006 |
| WO | WO 2007/090027 A2 | 8/2007 |

OTHER PUBLICATIONS

"Hash Function" by Wikipedia, downloaded from http://en.wikipedia.org/wiki/Hash_function on Oct. 22, 2009 (9 pages).

"Payment Card Industry (PCI) Data Security Standard (DSS) and Payment Application Data Security Standard (PA-DSS) Glossary", Ver. 1.2, Oct. 2008 (14 pages).

"Skiers now can pay for bus ride with a 'blink'" by Nicole Warburton of Deseret Morning News, Dec. 7, 2006 (2 pages).

"ISO/IEC 4909: Identification cards—Financial transaction cards—Magnetic stripe data content for track 3", First edition, Jul. 1, 2006 (21 pages).

"ISO/IEC 7812-1: Identification cards—Identification of issuers—Part 1: Numbering system", Second Edition, Sep. 15, 2000 (11 pages).

"ISO/IEC 7813: Information technology—Identification cards—Financial transaction cards", Sixth edition, Jul. 1, 2006 (12 pages).

"ISO/IEC 7816-5: Identification cards—Integrated circuit cards—Part 5: Registration of application providers", Second edition, Dec. 1, 2004 (13 pages).

"ISO/IEC 7816-6: Identification cards—Integrated circuit cards—Part 6: Interindustry data elements for interchange" Second edition May 15, 2004 (26 pages).

Bistrich, Austrian Patent Office, International Search Report for International Application No. PCT/KR96/00061, dated Jul. 29, 1996, 6 pages, Vienna, Austria.

"Query data faster using sorted hash clusters" by Scott Stephens, Jul. 27, 2005, downloaded May 21, 2009 (1 page).

"ISO/IEC 7816-4: Identification cards—Integrated circuit cards—Part 4: Organization, security and commands for interchange", Second edition, Jan. 15, 2005 (90 pages).

TECHNIQUES FOR AUTHORIZATION OF USAGE OF A PAYMENT DEVICE

CROSS-REFERENCE TO RELATED APPLICATIONS

This patent application claims the benefit of U.S. Provisional Patent Application Ser. No. 60/764,106 filed on Feb. 1, 2006, and entitled "Techniques for Authorization in Low Cost, High Volume Environments." The disclosure of the aforementioned Provisional Patent Application Ser. No. 60/764,106 is expressly incorporated herein by reference in its entirety.

FIELD OF THE INVENTION

The present invention relates generally to electronic commerce, and, more particularly, to electronic payment systems.

BACKGROUND OF THE INVENTION

There is an interest in employing cash alternatives in a variety of environments. Such cash alternatives can include, for example, payment devices such as payment cards and the like. In some cases, it may be difficult to employ such cash alternatives where transaction processing times are too long, for example, due to slow terminal decisioning. One non-limiting example of a situation where transaction times might need to be short is the case of high volume environments (for example, access to transit systems). Such high volume environments might also tend to involve relatively low-value transactions. Current techniques are unable to implement the traditional authorization decisioning process to the issuer and receive a response in real-time.

For example, U.S. Pat. No. 5,828,044 of Jun et al. discloses a non-contacting type radio frequency recognizing credit card system. The Jun et al. system includes: an RF card for being activated by receiving radio frequency from a card terminal (70) so as to transmit its own card number to the card terminal through radio frequency; the card terminal radiating a radio frequency to induce an electric generation in the RF card, and the card terminal transmitting a card number data (received through a radio frequency) to a wire-connected terminal computer; and the terminal computer reading the card number data from the card terminal to make an inquiry into a black list, to make a decision for issuing an approval of a transaction or a denying of the transaction, and to transmit the result of the decision to the card terminal.

U.S. Pat. No. 4,891,503 of Jewell discloses a distributed authorization system. The distributed authorization system and process for authorizing transactions utilizes a host computer communicating with a network of electronic terminals remote from the host computer. It includes storing negative file data in the electronic terminal containing information used to identify accounts for which requested transactions are to be denied, and storing authorization file data in the electronic terminal containing information used to determine whether to authorize a requested transaction. Upon entry of a transaction request, the data is checked against the terminal negative file data and immediately denied if the card account is contained in the terminal's negative file. If the transaction is not denied, authorization logic is performed in the electronic terminal resulting in terminal output denying the request, authorizing the request, or establishing an electronic connection from the terminal to the host computer to obtain authorization from the host computer. In establishing this connection, account data is transmitted from the host back to the remote electronic terminal resulting in terminal output either denying the request or authorizing the request. Also, during such connection, the terminal's authorization file is updated with account data, transmitted from the host computer to the electronic terminal. The completed transaction is stored in a terminal transaction queue file residing in the terminal for subsequent transmission to the host computer, and for use with a transaction request is subsequently entered at the terminal for the same account.

U.S. Pat. No. 5,285,382 of Muehlberger et al. discloses a system and method for processing credit and debit card validity and funds transactions from vending machines and similar terminals, including a data processor with memory storage capable of accessing an electronic clearing facility through a time rated (e.g., long distance) communication link. The system generates a real-time communication with the clearing facility to determine card validity and to initiate funds collection for transactions above a predetermined amount, and generates an off-line batch communication to the clearing facility at a time when communication rates are reduced to initiate funds collection for transactions in the system below the predetermined amount. The system relies upon local card validation, including memory storage of a previously validated card during a predetermined time period, as well as rejection of previously invalidated cards during another predetermined time period. The system and method is particularly useful for remote automated vending machines and automatic teller machines which typically handle a large volume of credit and debit transactions, each of which represents a small dollar amount.

A need exists for improvement in known techniques.

SUMMARY OF THE INVENTION

Principles of the present invention provide techniques for authorization of usage of a payment device. The payment device could be used, for example, at a merchant (broadly under stood to include any entity providing products and/or services or acting for such an entity). The payment device can have an associated account number. In one or more embodiments, authorization can be conducted effectively, yet sufficiently quickly, even for relatively low cost and/or high volume environments, such as transit systems and the like. An exemplary embodiment of a method (which can be computer-implemented), according to one aspect of the invention, for such authorization, includes the steps of facilitating an issuer; of the device obtaining an authorization message for the account number, based on desired spending limit parameters established by at least one of the merchant and the issuer; facilitating obtaining an issuer authorization decision; and responsive to the issuer authorization decision, facilitating setting a spending limit for the account number based on at least an appropriate one of the parameters.

An exemplary embodiment of an apparatus for authorization of usage of a payment device at a merchant, according to another aspect of the invention, includes a memory and at least one processor coupled to the memory. The processor can be operative to perform one or more method steps as described herein. In one or more embodiments, the apparatus is an active file manager.

Further, one or more method steps of the present invention can be implemented in the form of an article of manufacture comprising a machine readable medium that contains one or more programs which when executed implement such step (s).

One or more embodiments of the invention can provide substantial beneficial technical effects; for example, providing rapid decisions regarding approving or declining, in a time averaging less than 200 milliseconds (ms), with a high degree of decision accuracy. The 200 ms time is provided by way of example and illustration, and is not intended to be limiting. Further, in one or more embodiments of the invention, the benefits of the rapid decision response can be achieved while still maintaining the benefits of robust authorization processing by a payment processing network operator, along with the issuer's own authorization processing. The processing can include, by way of example and not limitation, risk analysis, restricted and delinquent card checks, card validation code checks, and open-to-buy verification.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
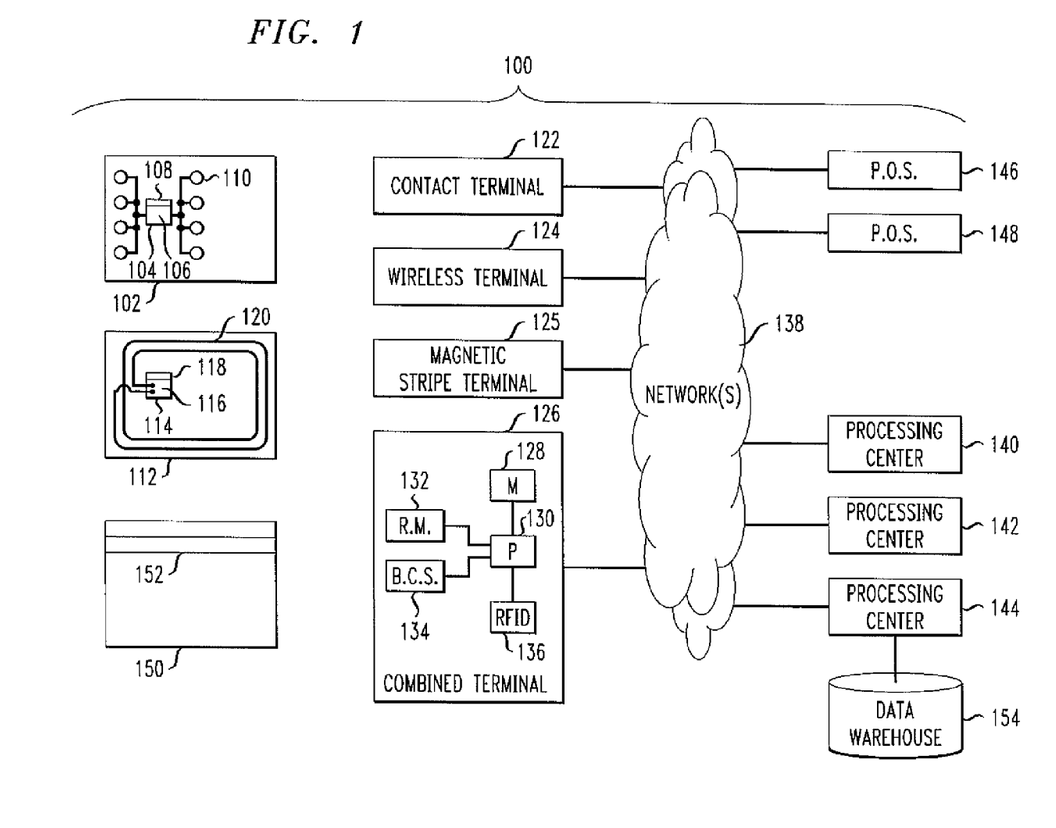
FIG. 1 shows an example of a system that can implement techniques of the present invention.

Attention should now be given to FIG. 1, which depicts an exemplary embodiment of a system 100, according to an aspect of the present invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. Other types of devices could include a conventional card 150 having a magnetic stripe 152, an appropriately configured cellular telephone handset, and the like. Indeed, techniques of the present invention can be adapted to a variety of different types of cards, terminals, and other devices.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by StepNexus Inc. Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendor's, could be employed Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present one possible standard to which such applications may conform is the EMV payment standard set forth by EMVCo, LLC (http://www.emvco.com). It will be appreciated that, strictly speaking, the EMV standard defines the behavior of a terminal; however, the card can be configured to conform to such EMV-compliant terminal behavior and in this sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets that implement techniques of the present invention. Such devices could include cards having a conventional form factor, smaller or larger cards, cards of different shape, key fobs, personal digital assistants (PDAs), appropriately configured cell phone handsets, or indeed any device with the capabilities to implement techniques of the present invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a conventional magnetic snipe card can be employed.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network. More than one network could be employed to connect different elements of the system. Processing centers 140, 142, 144 can include, for example, a host computer of an issuer of a payment device. Further details regarding one specific form of network will be provided below.

Many different retail or other establishments, represented by points-of-sale 146, 148, can be connected to network 138. In one or more embodiments of the invention, it is believed preferable that various establishments interface with a telecommunications network, such as a virtual private network (VPN), via one or more machines which are then connected to the network. This will be discussed further below. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" cards 102, 112, or the handset chassis and body in the case of a cellular telephone.

It will be appreciated that the terminals 122, 124, 125, 126 are examples of terminal apparatuses for interacting with a payment device of a holder in accordance with one or more exemplary embodiments of the present invention. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased. In some environments, such as, e.g., a transit system with a fixed fare, items 134 and 136 are not needed, since, e.g., only one item can be purchased (the fixed-fare ride), or identification can occur via other means.

The above-described devices 102, 112 can be ISO 7816-compliant contact cards or devices or ISO 14443-compliant proximity cards or devices. In operation, card 112 can be touched or tapped on the terminal 124 or 128, which then contactlessly transmits the electronic data to the proximity IC chip in the card 112 or other wireless device.

One or more of the processing centers 140, 142, 144 can include a database such as a data warehouse 154.

Figure 2:
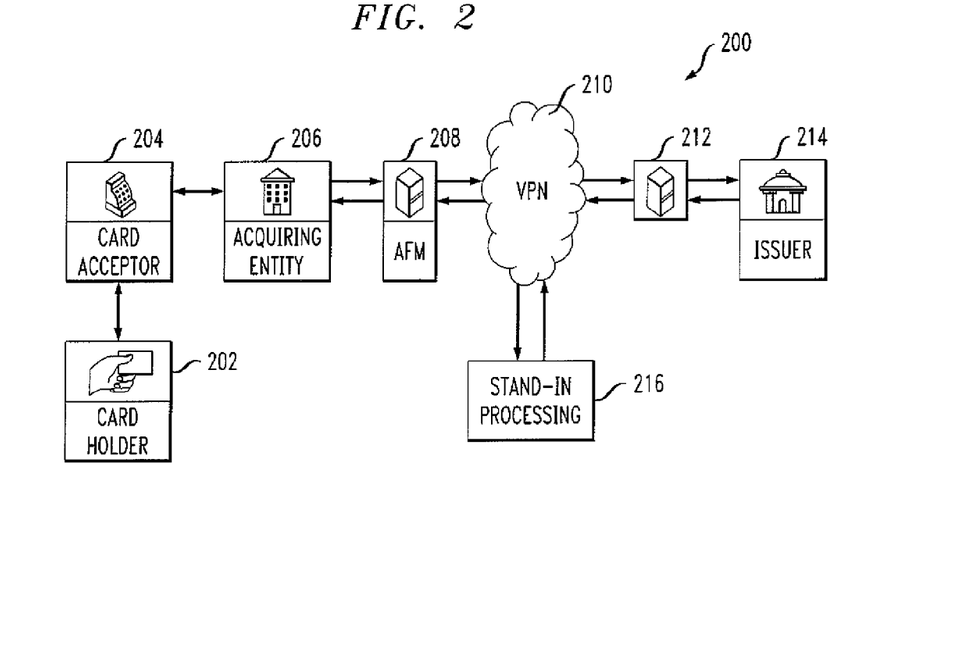
FIG. 2 shows initial and periodic "standard" authorization flow according to an exemplary embodiment of the present invention.

Attention should now be given to FIG. 2, which is a block diagram 200 of one possible specific exemplary embodiment of the present invention, also depicting (via the arrows) initial and periodic authorization flow according to the exemplary embodiment. In one or more embodiments of the invention, including the exemplary embodiment shown in FIG. 2, the authorization flow is a "standard" authorization flow, in the sense that the flow per se is commonly recognized, or commonly accepted: the request originates from the merchant and/or acquiring entity, and traverses the payment network (in this case a VPN 210 to be discussed below) to the issuer. The issuer 214 then sends a response (or a stand-in processor 216 sends it on behalf of the issuer) back through the payment network, to the merchant and/or acquiring entity. The terminology "standard" should not be taken as implying that the inventive use and contents of the message(s) as described herein (for example, the inventive setting of the spending limit) are taught or suggested in any prior techniques.

As shown at 202, the holder of a card or other payment device interacts with a terminal at a facility of a card acceptor 204, corresponding, e.g., to terminals and points of sale as described with respect to FIG. 1. The card acceptor sends transaction information to an acquiring entity 206, for example, via a network such as described in FIG. 1. By way of example and not limitation, an acquiring entity could include an acquirer or other entity responsible for the acquired transaction, whether they are referred to in common use by artisans skilled in the electronic payment arts as an "acquirer" or an "acquiring processor," and the like (the acquiring entity can also be referred to as a consolidator). An active file manager (AFM) 208 can be provided between acquiring entity 206 and a telecommunications network such as VPN 210 (which can be, for example, a payment processing network). Manager 208 can be located in a variety of places, e.g., at the acquiring entity's facility, and could be operated by, e.g., an acquirer. Further, manager 208 could reside on the same machine as a conventional front end communications processor such as a MASTERCARD INTERFACE PROCESSOR™ or MIP™ processor (trademarks of MasterCard International, Inc. of Purchase, N.Y.), or could reside on a separate machine interfacing with such a conventional front end processor, which then interfaced with network 210. In summary, manager 208 should be connected to network 210 for authorization processing, but as noted, can be located in a variety of places.

Another conventional front-end communications processor 212, such as a MIP™ processor, can be located, e.g., at the facility of an issuer 214 to provide access to the aforementioned VPN 210. Of course, there may be a plurality of similarly-equipped issuer, and other, facilities.

Stand-in processing can be provided via an authorization subsystem located at a central location 216. Such subsystem can interface with the VPN 210 and can respond to provide authorization service on behalf of issuer 214 when, e.g., the issuer is a member or other customer or entity not connected via the VPN, is unavailable, cannot be reached, or responds late (for example, outside the time limits specified by the network). It is currently envisioned that most or all members and/or customers will be electronically connected to the payment processing network operator via the VPN, as issuer 214 is in FIG. 2.

Figure 3:
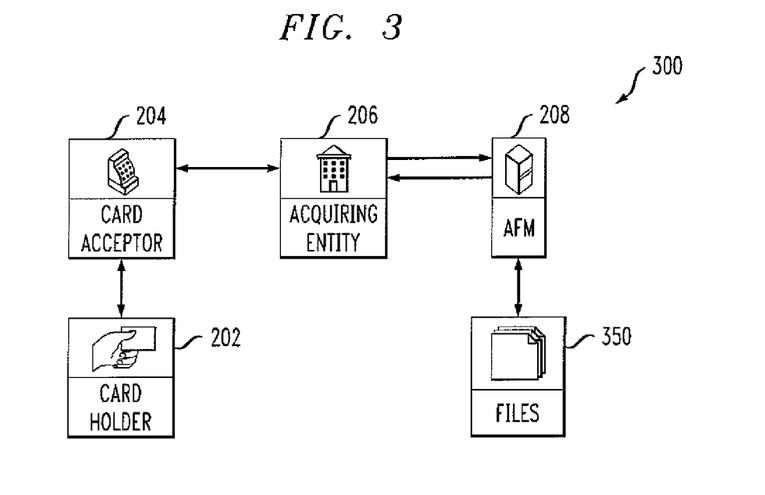
FIG. 3 shows file processing flow according to an exemplary embodiment of the present invention.

FIG. 3 shows a block diagram 300 of certain optional features of system 200, which can be configured to implement a file processing flow according to an exemplary embodiment of the present invention. Items similar to those in FIG. 2 have received the same reference character and will not be described again. The arrows are for convenience in depicting the file processing flow. In block diagram 300, active file manager 208 is provided with an appropriate file structure 350 to be discussed further below.

To accelerate terminal decisioning in high volume environments such as the transit market (where transactions may often be for a relatively small monetary amount), according to an aspect of the present invention, the offering of an authorization message from the merchant to the issuer can be facilitated (in one or more embodiments, the message can be a "standard" message in the sense described above). The first time a cardholder account number is utilized at the merchant location (in such a case, the account number will typically not be on file yet), the transaction can be (optionally) automatically approved (in one or more embodiments, by an intermediary such as an active file manager to be described herein). Following the issuance of the approval response to the terminal, a payment processing network operator (including, by way of example and not limitation, an entity colloquially known as a "credit card company") can facilitate an authorization message all the way to the issuer for that cardholder account number. Again, as noted above, such message can be a "standard" message, not in the sense of being taught or suggested by prior techniques, but in the sense that the flow of messages (as opposed to inventive usage and contents) is commonly recognized, or commonly accepted. The dollar (or other currency) amount reflected in the authorization request can be based on desired spending limit parameters established by an entity such as the merchant and/or the issuer. If the issuer declines the authorization, the spending limit will be set to zero for that cardholder account number, for example, by making an appropriate entry in a file designated as the active file, to be discussed further below. If the transaction is approved, a spending limit equal to the activity limit amount for a certain time period (e.g. the pre-authorization amount for a day), preferably (but optionally) less the value of the first transaction, can be established, again, e.g., via an appropriate entry in the active file.

Each subsequent transaction can be verified, for example, against the active file, to determine if the account has a "pre-approved spending limit." As additional transactions decrement against the spending limit, authorization requests can be initiated to the issuer to replenish the spending limit. Note that the merchant could elect to perform an authorization for the first transaction before sending a response to the terminal. The merchant may wish to weigh the response time against the financial risk of the transaction.

The exemplary solution just discussed may afford one or more advantages. For example, it can provide the merchant and the acquirer control over authorization decisioning, leveraging the authorization processes (which can, as noted, employ a "standard" flow). The on-line authorization aspect of this solution can limit merchant liability for the transactions, which results in a more attractive solution to merchants and acquirers. This solution also provides the issuer with additional risk management in high traffic and/or quick response environments, as the issuer is making the authorization decision. The issuer can leverage their existing fraud scoring functionality to quickly identify and act on fraudulent activity within these environments.

The on-line authorization feature also means that these transactions can be sent to a location such as 216 for stand-in processing, on behalf of the issuer, should the network experience communication problems. As with any stand-in processing, the transactions can be stored and forwarded to the issuer once the issuer is able to receive messages again; either as individual messages or in a batched format.

By leveraging existing infrastructure, these transactions can be included in a data warehouse such as 154, and subsequently can be used by the issuer in a variety of ways, including participation in a rewards program which would be of benefit to their cardholders.

Note that the above-described flow is typical of the authorization that can be sent all the way to the issuer or stand-in processing facility, on behalf of the issuer (again, optionally but preferably employing "standard" message flow). It can be performed for the first transaction that is seen for a particular account number and then periodically after that first transaction. The authorization is sent, e.g., after an active file response is provided to the merchant, based on the active file process flow described below. Once the account number is known in the system (after its first use), subsequent authorizations can be performed prior to the available balance reaching a predetermined value, such as zero. Once the value is depleted, the account balance can be reset by conducting another authorization.

Front end processors, such as processor 212, and VPNs, such as VPN 210, are well-known to skilled artisans In one specific example, the processor 212 is a MIP™ processor, and the VPN 210 is a telecommunications network providing MASTERCARD BANKNET® telecommunications network services (registered trademark of MasterCard International, Inc of Purchase, N.Y.).

Figure 4:
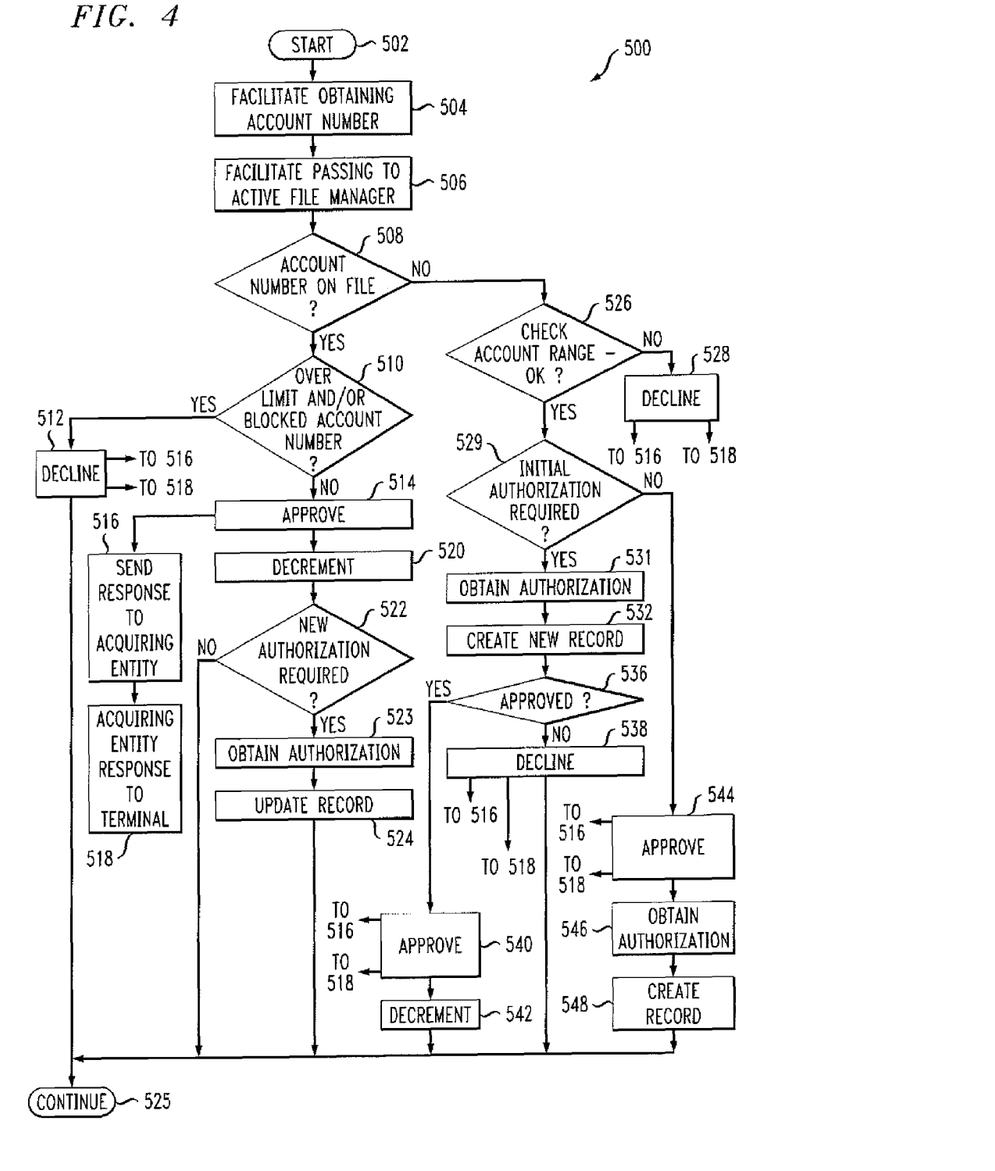
FIG. 4 is a flow chart of an exemplary method according to an aspect of the present invention.

Referring to FIG. 4, and also back to FIG. 3, active file processing flow according to one exemplary embodiment of the present invention will now be considered FIG. 4 presents a flow chart 500 of exemplary method steps for such processing, indicative of a method of authorization of usage of a payment device (having an associated account number) at a merchant. After beginning at block 502, at step 504, a step of facilitating obtaining an account number can be conducted; for example, the cardholder can tap his or her card or other payment device at the merchant's terminal. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. At block 506, a step of facilitating passing of the account number to the active file manager 208 is conducted. For example, the account number can be passed through the acquiring entity to manager 208.

Processing by a payment processing network operator can proceed, for example, as follows. The active file manager can process the transaction against the active file. At decision block 508, a determination can be made whether the account number is on file. If such is the case, as indicated by the "YES" branch of block 508, a determination is made at block 510 whether the spending limit has been reached, or the account number is blocked, or some other predetermined limiting condition is exhibited by the account, such that the transaction should be declined. As indicated at the "NO" branch of block 510, if the spend limit has not been reached, approval of the transaction, sending a response to the acquiring entity, and having the acquiring entity respond to the terminal can be carried out as at blocks 514, 516, and 518, respectively. In parallel, decrementing of the spend limit (for example, by updating the file) can be carried out as at block 520. As noted, as used herein, "facilitating" an action includes performing the action, making the action easier, helping to carry the action out, or causing the action to be performed. For purposes of illustrative convenience, not every block in FIG. 4 includes the word "facilitate," but it will be understood that the method depicted broadly includes facilitation of the indicated actions as well as their actual performance. If the case of the "YES" branch of block 510, the transaction is declined at block 512, and processing continues at block 525. Also, a parallel flow to steps 516 and 518 can take place from block 512.

At block 522, a determination can be made whether a new authorization is required. Such could be the case when certain predetermined criteria occur, for example, when a certain number of transactions since the last authorization have occurred or when a certain balance is reached, or in general, when a parameter associated with the account number is reaching a predetermined relationship with the spending limit (say, available balance getting too low or amount spent without a new authorization getting too high). When the counter, balance, or other indication has been reached so as to indicate a new authorization is required, as shown at block 523, authorization can be obtained and then the appropriate record can be updated as at block 524. Processing continues at block 525. It should be noted that the steps depicted in the flow charts herein are exemplary in nature, and not all need be performed in any particular embodiment of the invention; furthermore, the older of the steps may be changed as desired. However, it is presently believed preferable that step 523 be performed after the response is sent to the acquiring entity in block 516, so as to improve response time. When a new authorization is not required in block 522 ("NO" branch), processing can proceed directly to block 525. In general, it may be desirable to approve an individual transaction before seeking a new authorization from the issuer (setting or resetting spending limit), to keep transaction times low.

If the account number is not on file, i.e., "NO" branch of block 508, as shown at decision block 526, a check can be made of the account range to determine if transactions are allowed for the particular merchant type. If the transactions are allowed, as at the "YES" branch of block 526, a decision can be made at block 529 whether initial authorization is required; if such is the case, authorization can be obtained at block 531. A new record in the active file can be created at block 532. An approval decision can be made at block 536, and responsive to a "YES," approval and decrementing steps analogous to steps 514 and 520 can be carried out at steps 540 and 542. Processing continues at block 525. If a "NO" decision is reached, the decline occurs at block 538. Also, a parallel flow to steps 516 and 518 can take place from both blocks 538 and 540.

If the transaction(s) are not allowed (e.g., based on a zero amount spend limit) ("NO" branch of block 526), the transaction is declined at block 528, and (parallel) flow proceeds with steps 516 and 518. Also, if decision block 529 yields a "NO," approval can take place as at block 544, and steps 546 and 548 can be performed, analogous to steps 531 and 532 respectively, except that record creation in block 548 is not for a new record as in block 532. Also, a parallel flow to steps 516 and 518 can take place from block 544. Following block 548, processing can continue at block 525.

In view of the foregoing discussion, it will be appreciated that in one aspect, following the issuance of the approval response to the terminal, the payment processing network operator can facilitate the issuer obtaining an authorization message for that cardholder account number (as noted, in one or more embodiments, a "standard" message flow can be employed). The dollar amount reflected in the authorization request can, as noted, be based on desired spending limit parameters established by an appropriate entity such as, e.g., the merchant and/or issuer. This functionality can be carried out, e.g., via the active file managers. It will be appreciated that as contemplated herein, including the claims, facilitation of the issuer obtaining the authorization message is inclusive of the possibility of the aforementioned stand-in processing, which provides a response on behalf of the issuer based on issuer-provided parameters, and can also employ a ("standard") authorization message as described herein. If the issuer authorizes the transaction, setting a spending limit equal to the daily (or other) activity limit (e.g., the pre-authorization amount for the day) amount, can be facilitated, again, e.g., via an appropriate entry in the active file. In one or more embodiments, the spending limit is set equal to the daily (or other) activity limit (e.g. the pre-authorization amount for the day) amount, less the value of the first transaction. However, in some cases, for example, when transactions are to be of a relatively small and/or fixed amount, the value of the first transaction might not need to be subtracted or might be built in to the activity limit.

Examples will now be given of content of exemplary files in file structure 350, which may be maintained on processor 208 by a payment processing network operator; it is to be appreciated that these are exemplary in nature, and various implementations may include less than all the indicated parameters, and/or may include additional parameters not discussed here. Further, files may be combined or additional files may be employed as desired. Contents of an account range file, which may be consulted, for example, in connection with block 526, may include, but ale not limited to, one or more of a low range, a high range, a transaction-allowability indicating parameter indicating whether certain (e.g., transit system such as bus, subway, metro, underground) transactions are allowed, an authorization frequency in time units such as days, an authorization frequency in terms of number of transactions, and the like. The low range and high range might specify a range of account numbers eligible for a certain kind of transaction. For example, for sixteen digit account numbers, the eleven most significant digits of a lower limit on eligible account numbers and the eleven most significant digits of an upper range of eligible account numbers might be specified. The parameter indicating whether certain transactions were allowed could have, e.g., a simple yes or no value.

Contents of the aforementioned active file may include, but are not limited to, one or more of an account number, a limit parameter (such as maximum dollar amount per transaction), a last authorization date, a number of transactions since authorization, an authorization frequency in days (how much time, e.g., how many days, between authorizations) and an authorization frequency specified in transaction terms (e.g., how many transactions between authorizations).

An exemplary nightly batch file maintenance process will now be described. In terms of the account range file, the dedicated processor, such as 208, can receive a nightly refresh file from the payment processing network operator based on information from the issuer, and a full file replace can be performed on the dedicated processor. In terms of the active file, all account numbers that have not been used within X days can be deleted (X is a parameter that can be specified by the merchant, acquirer or other acquiring entity and/or processor) based on the last authorization date. The skilled artisan will of course appreciate that in this context, "processor" means an entity such as the acquirer or other acquiring entity, payment processing network operator, bank, large merchant, and the like, not a piece of hardware. Further, an authorization can be periodically requested for those account numbers previously found on the payment processing network operator's "stop list" to determine whether the account number has been unblocked by the issuer.

It will be appreciated that one or more exemplary embodiments of the present invention can provide one or more advantages. For example, improved merchant and acquirer control over authorization decisioning can be provided, leveraging "standard" authorization processes. On-line authorization aspects of one or more embodiments of the present invention can serve to limit merchant liability for transactions, which results in a more attractive solution for merchants and acquirers. Furthermore, the issuer can be provided with additional risk management in high traffic, quick response environments, as the issuer is making the authorization decision. The issuer can leverage their existing fraud scoring functionality to quickly identify and act on fraudulent activity within these environments. Techniques of one or more embodiments of the present invention can allow verifying that the card is able to be used for a given purchase at a given time, including steps such as determining it the card is valid, requesting a "load" of funds to be used for current purchases, decrementing the funds with each use, periodically reloading the funds and checking status of the card (via the inventive active file manager, outside of decisioning, such as terminal or authorization decisioning).

Figure 5:
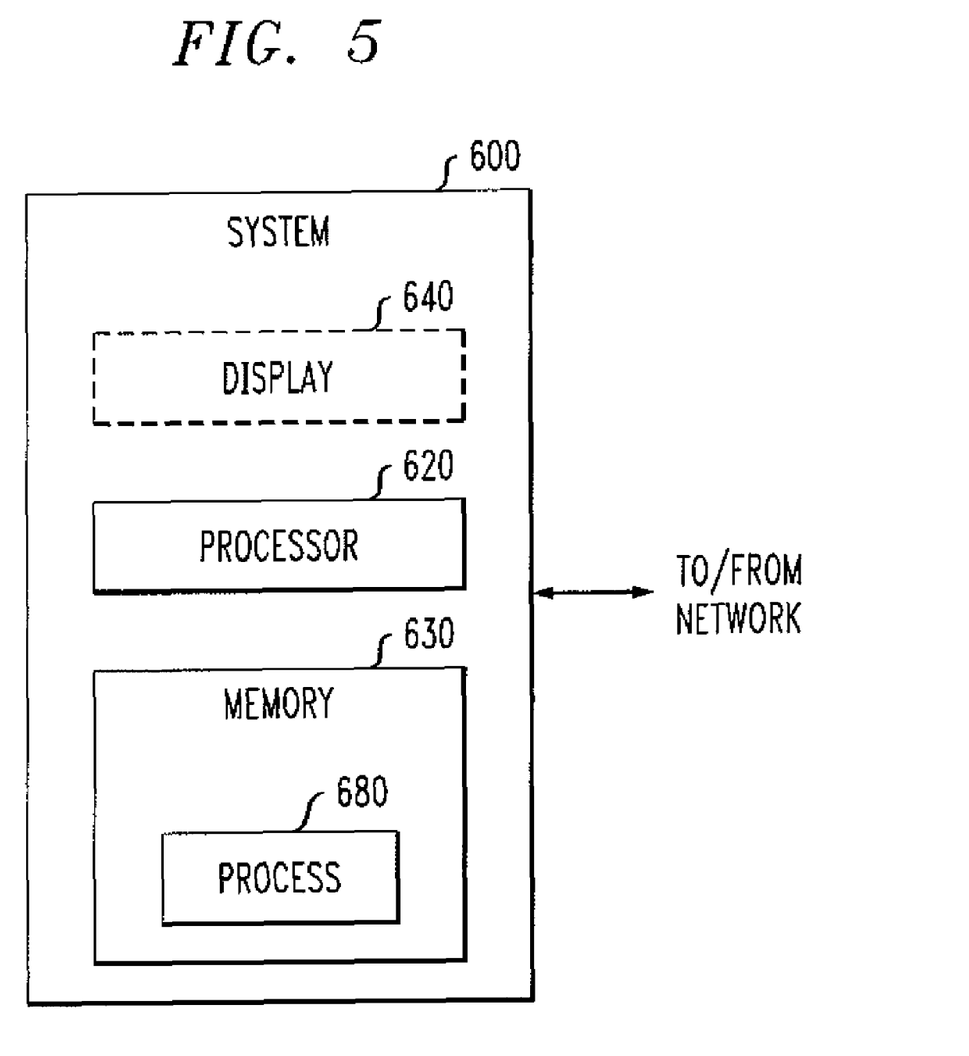
FIG. 5 is a block diagram of an exemplary computer system useful in one or mote embodiments of the present invention.

The invention can employ hardware and/or software aspects. Software includes but is not limited to firmware, resident software, microcode, etc. Software might be employed, for example, in connection with one or more of a terminal 122, 124, 125, 126, a front end processor 208, 212, an authorization subsystem located at a central location 216, or a processing center 140, 142, 144 (optionally with data warehouse 154) of a merchant, issuer, acquirer, processor, or payment processing network operator. Firmware might be employed, for example, in connection with payment devices such as cards 102, 112. FIG. 5 is a block diagram of a system 600 that can implement part or all of one or more aspects or processes of the present invention. As shown in FIG. 5, memory 630 configures the processor 620 (which could correspond, e.g., to processor portions 106, 116, 130, processors of elements 208, 212, processors of authorization subsystems such as that located at a central location 216 or processors of remote hosts in centers 140, 142, 144) to implement one or more aspects of the methods, steps, and functions disclosed herein (collectively, shown as process 680 in FIG. 5). Different method steps can be performed by different processors. The memory 630 could be distributed or local and the processor 620 could be distributed or singular. The memory 630 could be implemented as an electrical, magnetic or optical memory, or any combination of these or other types of storage devices (including memory portions as described above with respect to cards 102, 112). It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, 208, 212, 216 or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 125, 126, processing centers 140, 142, 144 with data warehouse 154, processors 208, 212, processors of authorization subsystems such as that located at a central location 216, or payment devices such as cards 102, 112 can make use of computer technology with appropriate instructions to implement method steps described herein. By way of further example, a terminal apparatus 122, 124, 125, 126 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe). By way of yet a further example, an active file manager apparatus for processing an active file in a payment system, could include a memory, and at least one processor coupled to the memory. The processor can be operative to perform one or more method steps described herein, or otherwise facilitate their performance.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for authorization of usage of a payment device at a merchant, said payment device having an associated account number and being issued by an issuer coupled to a payment processing network, said method comprising the steps of:
    facilitating obtaining said account number in connection with a putative transaction with a terminal of said merchant;
    facilitating determining whether said account number is being utilized at said merchant for the first time, using an active file manager apparatus intermediate said terminal and said payment processing network;
    responsive to said determining step indicating that said account number is being utilized at said merchant for the first time:
        facilitating said issuer obtaining an authorization message, through said payment processing network, for said account number;
        facilitating obtaining an issuer authorization decision;
        approving said putative transaction, with said active file manager, without use of said issuer authorization decision;
        responsive to said issuer authorization decision, facilitating setting a spending limit for said account number;
    facilitating conducting subsequent putative transactions for said account number;
    facilitating determining that a parameter associated with said account number is reaching a predetermined relationship with said spending limit; and
    responsive to said determining that said parameter is reaching said predetermined relationship, facilitating obtaining a new issuer authorization decision to adjust a spendable balance associated with said account number.

2. The method of claim 1, wherein:
    said authorization message is based on desired spending limit parameters established by at least one of said merchant and said issuer; and
    said spending limit for said account number is set based on at least an appropriate one of said parameters.

3. The method of claim 2, wherein said authorization message comprises a standard payment processing network authorization message.

4. The method of claim 2, wherein said spending limit is based at least on said appropriate one of said parameters, less a value of said transaction.

5. The method of claim 2, wherein:
    said active file manager is operated by an acquiring entity;
    said issuer is connected to said acquiring entity via said payment processing network; and
    said active file manager is interposed between said acquiring entity and said payment processing network.

6. The method of claim 2, further comprising the additional step of facilitating inclusion of said transactions in a data warehouse, for subsequent usage by said issuer of said device.

7. The method of claim 2, further comprising the additional steps of:
    facilitating approval of given ones of said subsequent putative transactions, where appropriate, by said active file manager;
    determining that an account associated with said account number does not exhibit a limiting condition; and
    performing a spendable balance adjustment.

8. The method of claim 7, further comprising the additional step of facilitating sending of a response to an acquiring entity associated with said transaction, substantially in parallel with said approval of said given ones of said subsequent putative transactions.

9. The method of claim 7, wherein:
    said putative transaction and said subsequent putative transactions comprise attempts to enter a transit system;
    said merchant comprises an operator of said transit system;
    said spending limit is based upon a periodic activity limit for said transit system; and
    said limiting condition comprises at least one of exceeding said spending limit and said account number being blocked.

10. An active file manager apparatus for authorization of usage of a payment device at a merchant, the payment device having an associated account number and being issued by an issuer coupled to a payment processing network, said apparatus comprising:
    a memory; and
    at least one processor coupled to said memory, said processor being operative to:
        facilitate obtaining said account number in connection with a putative transaction with a terminal of said merchant, said active file manager apparatus being intermediate said terminal and said payment processing network;
        facilitate determining whether said account number is being utilized at said merchant for the first time;
        responsive to said determining step indicating that said account number is being utilized at said merchant for the first time:
            facilitate said issuer obtaining an authorization message, through said payment processing network, for the account number;
            facilitate obtaining an issuer authorization decision; and approve said putative transaction, without use of said issuer authorization decision;

responsive to said issuer authorization decision, facilitate setting a spending limit for the account number;

facilitate conducting subsequent putative transactions for said account number;

facilitate determining that a parameter associated with said account number is reaching a predetermined relationship with said spending limit; and responsive to said determining that said parameter is reaching said predetermined relationship, facilitate obtaining a new issuer authorization decision to adjust a spendable balance associated with said account number.

11. The active file manager apparatus of claim 10, wherein:
said authorization message is based on desired spending limit parameters established by at least one of the merchant and the issuer; and
said spending limit for said account number is set based on at least an appropriate one of said parameters.

12. The apparatus of claim 11, wherein said authorization message comprises a standard payment processing network authorization message.

13. The apparatus of claim 11, wherein said spending limit is based at least on said appropriate one of said parameters, less a value of said transaction.

14. The apparatus of claim 11, wherein said memory stores an active file, said active file comprising the account number, a limit parameter, a last authorization date, a number of transactions since authorization, and an authorization frequency.

15. The apparatus of claim 14, wherein said memory further stores an account range file, said account range file comprising a low range, a high range, a transaction allowability indicating parameter, and an authorization frequency.

16. The active file manager apparatus of claim 11, wherein said at least one processor is further operative to:
facilitate approval of given ones of said subsequent putative transactions, where appropriate;
determine that an account associated with said account number does not exhibit a limiting condition; and
perform a spendable balance adjustment.

17. The apparatus of claim 16, wherein:
said active file manager apparatus is operated by an acquiring entity;
the issuer is connected to the acquiring entity via said payment processing network; and
said active file manager is configured to be interposed between the acquiring entity and the payment processing network.

18. The apparatus of claim 17, wherein said memory stores an active file with account numbers including said associated account number and said processor is further operative to:
receive a nightly refresh file from a payment processing network operator based on information from the issuer; and
delete those of said account numbers in said active file that have not been used within a predetermined time period.

19. The apparatus of claim 18, wherein given ones of said account numbers are on a stop list, and wherein said processor is further operative to periodically request authorization for those of said account numbers previously found on said stop list to determine whether said account numbers have been unblocked by the issuer.

20. The apparatus of claim 18, wherein said processor is further operative to facilitate inclusion of said transactions in a data warehouse, for subsequent usage by said issuer of said device.

21. The apparatus of claim 18, wherein said processor is further operative to facilitate sending of a response to an acquiring entity associated with said transaction, substantially in parallel with said approval of said given ones of said subsequent putative transactions.

22. The active file manager apparatus of claim 16, wherein:
said putative transaction and said subsequent putative transactions comprise attempts to enter a transit system;
the merchant comprises an operator of the transit system;
said spending limit is based upon a periodic activity limit for the transit system; and
said limiting condition comprises at least one of exceeding said spending limit and said account number being blocked.

23. A computer program product comprising a tangible computer readable recordable storage medium including computer usable program code for authorization of usage of a payment device at a merchant, said payment device having an associated account number and being issued by an issuer coupled to a payment processing network, said computer program product including:
computer usable program code for facilitating obtaining said account number in connection with a putative transaction with a terminal of said merchant;
computer usable program code for facilitating determining whether said account number is being utilized at said merchant for the first time, using an active file manager apparatus intermediate said terminal and said payment processing network;
computer usable program code for, responsive to said determining step indicating that said account number is being utilized at said merchant for the first time:
facilitating an issuer of the device obtaining an authorization message for said account number;
facilitating obtaining an issuer authorization decision;
approving said putative transaction, with said active file manager, without use of said issuer authorization decision;
responsive to said issuer authorization decision, facilitating setting a spending limit for said account number;
computer usable program code for facilitating conducting subsequent putative transactions for said account number;
computer usable program code for facilitating determining that a parameter associated with said account number is reaching a predetermined relationship with said spending limit; and
computer usable program code for, responsive to said determining that said parameter is reaching said predetermined relationship, facilitating obtaining a new issuer authorization decision to adjust a spendable balance associated with said account number.

24. The computer program product of claim 23, wherein:
said authorization message is based on desired spending limit parameters established by at least one of the merchant and the issuer; and
said spending limit for said account number is set based on at least an appropriate one of said parameters.

25. The computer program product of claim 24, wherein said authorization message comprises a standard payment processing network authorization message.

26. The computer program product of claim 24, wherein said spending limit is based at least on said appropriate one of said parameters, less a value of said transaction.

27. The computer program product of claim 24, said product being configured to operate in circumstances wherein:

said active file manager is operated by an acquiring entity;

said issuer is connected to said acquiring entity via said payment processing network; and said active file manager is interposed between said acquiring entity and said payment processing network.

28. The computer program product of claim 24, further comprising computer usable program code for facilitating inclusion of said transactions in a data warehouse, for subsequent usage by said issuer of said device.

29. The computer program product of claim 24, further comprising:

computer usable program code for facilitating approval of given ones of said subsequent putative transactions, where appropriate;

computer usable program code for determining that an account associated with said account number does not exhibit a limiting condition; and computer usable program code for performing a spendable balance adjustment.

30. The computer program product of claim 29, further comprising computer usable program code for facilitating sending of a response to an acquiring entity associated with said transaction, substantially in parallel with said approval of said given ones of said subsequent putative transactions.

31. The computer program product of claim 29, wherein:

said putative transaction and said subsequent putative transactions comprise attempts to enter a transit system;

the merchant comprises an operator of the transit system;

said spending limit is based upon a periodic activity limit for the transit system; and said limiting condition comprises at least one of exceeding said spending limit and said account number being blocked.

* * * * *